United States Patent
Cole et al.

(10) Patent No.: US 7,222,329 B2
(45) Date of Patent: May 22, 2007

(54) BUSINESS SYSTEMS MANAGEMENT: REALIZING END-TO-END ENTERPRISE SYSTEMS MANAGEMENT SOLUTION

(75) Inventors: David William Cole, Austin, TX (US); Stephen William Nekolaichuk, Georgetown, TX (US); Tedrick Neal Northway, Wood River, IL (US); Paul David Peterson, Round Rock, TX (US); Alan Paul Pickersgill, Gosport (GB); Chris Edward Terry, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 09/726,014

(22) Filed: Nov. 29, 2000

(65) Prior Publication Data

US 2002/0091989 A1 Jul. 11, 2002

(51) Int. Cl.
*G06F 9/44* (2006.01)
(52) U.S. Cl. .................. 717/101; 717/104; 717/120
(58) Field of Classification Search ............ 717/101, 717/104, 120; 705/1
See application file for complete search history.

(56) References Cited

U.S. PATENT DOCUMENTS

| | | | | |
|---|---|---|---|---|
| 5,737,727 A | * | 4/1998 | Lehmann et al. | 705/7 |
| 5,918,207 A | * | 6/1999 | McGovern et al. | 705/1 |
| 5,960,410 A | * | 9/1999 | Halpern | 705/21 |
| 6,018,627 A | * | 1/2000 | Iyengar et al. | 717/103 |
| 6,023,578 A | * | 2/2000 | Birsan et al. | 717/105 |
| 6,038,393 A | * | 3/2000 | Iyengar et al. | 717/104 |
| 6,052,525 A | * | 4/2000 | Carlson et al. | 717/100 |
| 6,167,564 A | * | 12/2000 | Fontana et al. | 717/104 |
| 6,226,792 B1 | * | 5/2001 | Goiffon et al. | 717/120 |
| 6,269,474 B1 | * | 7/2001 | Price | 717/104 |
| 6,304,892 B1 | | 10/2001 | Bhoj et al. | |
| 6,349,404 B1 | * | 2/2002 | Moore et al. | 717/104 |
| 6,856,983 B2 | * | 2/2005 | Cox et al. | 706/52 |
| 6,983,321 B2 | | 1/2006 | Trinon et al. | |

* cited by examiner

*Primary Examiner*—Wei Zhen
*Assistant Examiner*—Qamrun Nahar
(74) *Attorney, Agent, or Firm*—Duke W. Yee; David A. Mims, Jr.; Theodore D. Fay, III

(57) ABSTRACT

A method for integrating the IT components which support a business process into a single end-to-end management platform is provided. The method comprises decomposing a business process into a set of enabling applications and then documenting the technology elements and support organizations which are necessary to execute those enabling applications. The required monitors for the business process enabling technology can be deployed which will allow the mapping of technology problems to business problem and the development of correlation rules. This information is then used to develop an end-to-end business process event management (or other system management disciplines such as performance management) platform, which can be integrated into any preexisting event management process. In one embodiment of the present invention, the event management platform can be constructed between several business entities.

18 Claims, 2 Drawing Sheets

BUSINESS SYSTEMS MANAGEMENT: REALIZING END-TO-END ENTERPRISE SYSTEMS MANAGEMENT SOLUTION

BACKGROUND OF THE INVENTION

1. Technical Field

The present invention relates to a business method for computer networks. More specifically, the present invention relates to the integration of disparate applications into a single functional application model that is then managed from an IT perspective as a single integrated system.

2. Description of Related Art

Currently, companies have "business processes" such as a Banking loan process, that are enabled by multiple heterogeneous technology. Because the business process itself may span multiple lines of business both internally and externally (supply chain processes), very often the enabling technology is of disparate types, managed by disjoint groups with little systems management integration between them. An example of this would be a loan process that is enabled by technology ranging from application, database, network, and server. In this example, it is very likely that each application, and associated enabling technology, would have a support group. Each group has a very focused view on their component, but no one has the business process view which is the aggregate of each of these "towers" as viewed by the business. The systems management paradigm is not aligned with how the business consumes the technology at the business level, and therefore does not reflect the true "health" of the business process as viewed by the consumers of the business process.

Therefore, a method of integrating the disparate applications into a single functional application model that includes the interdependencies, relationships and interfaces of each application would be desirable.

SUMMARY OF THE INVENTION

The present invention provides a method for integrating the many heterogeneous IT components (application, database, server, network) which enable a business process into a single end-to-end management platform. The method comprises decomposing a business process (intra-enterprise, extra-enterprise (i.e. multiple business entities) or both) into a set of enabling applications and then documenting the technology elements and support organizations which are necessary to execute and mange those enabling applications. The required monitors for the business process enabling technology can be deployed which not only monitor the discreet IT components but also the interfaces between them that are imposed by the business process itself. An important, and unique, feature of this method is the ability to map technology problems to business problems and the development of cross-platform contextual (business process context) correlation rules. This information is then used to develop an end-to-end business process event management platform (can be used for other systems management processes as well such as Performance Management), which can be integrated into any preexisting event management (systems management) process. In one embodiment of the present invention, the event management platform can be constructed between several business entities.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Businesses have numerous critical processes which are enabled by multiple, disparate technologies. In today's IT environment, there is often a support group for each type of technology, each with its own "tower" management platform. In addition, each group has its own management tools typically focused on monitoring a specific subsystem or element within the IT infrastructure, with little or no capability to evaluate how that component actually impacts the business process from an end-to-end perspective. Because the management towers are often very disjoint, complex problems are often very difficult to quickly identify, often lead to multiple support personnel being needlessly dispatched, and have no concept of business impact. This is particularly evident in the current event management and business process "view" tools which only consider the "IT severity" of an event as opposed to mapping a particular anomaly to a business impact. The following example will help illustrate this concept.

One server must communicate to another server, via a network route, in order to complete a particular business transaction. If the network failed, or went down, from an IT perspective the network event generated by this failure might be "fatal" or completely down. At the network support layer this IT component failure would trigger immediate support attention. However, at the business process layer, the network failure is only "fatal" or fully down if there is a current request for these two systems to communicate. If no one needs the business process at the point of failure then the fact that a network is down is important, but to the business, it is transparent. At the event level of the network failure there is no intelligence to determine whether or not the business process has actually been impacted and will always show "fatal" when it goes down. This means that each IT event must be mapped to a business impact within the context of the business process. The present invention enables this mapping of IT severity to business impact severity.

The present invention provides an end-to-end Business Systems Management (BSM) capability with the focus on integrating the specific IT infrastructure components supporting one, or many, key business processes into a single end-to-end management platform. One of the objects of the invention is to provide an Event Management system which integrates the monitoring and alerting of disparate enabling technologies to achieve efficient and succinct problem determination and notification. The systems management platform is not only capable of monitoring and managing a server as a "tower" but also the interfaces between the various technology towers that exist, because the business processes they support create the requirements for these systems to communicate.

Figure 1:
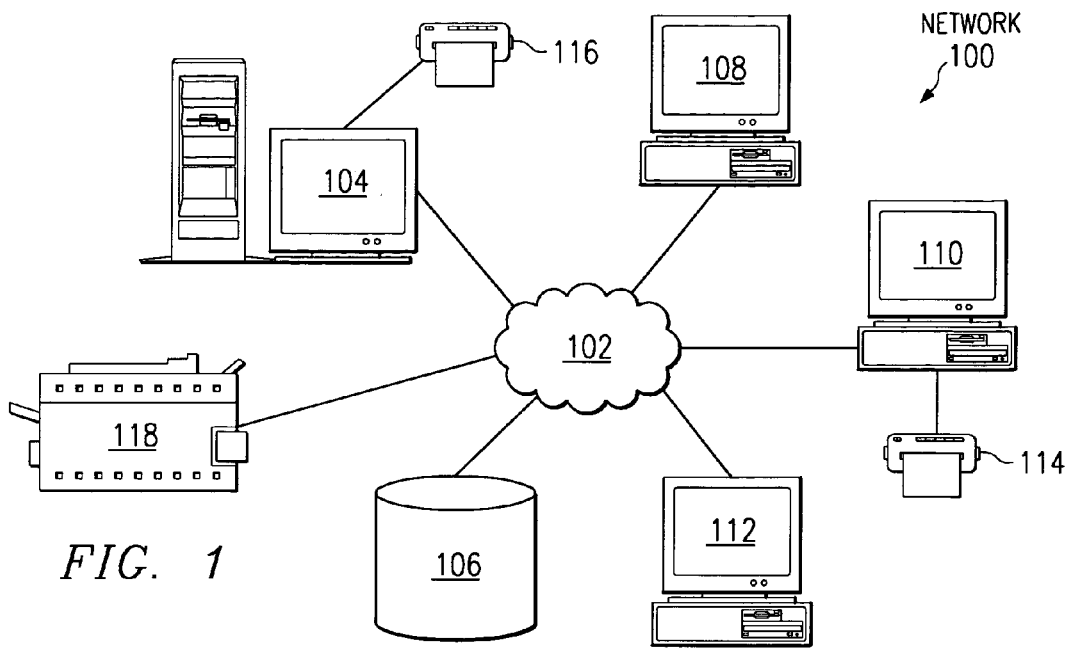
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. However, any protocol can be used. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
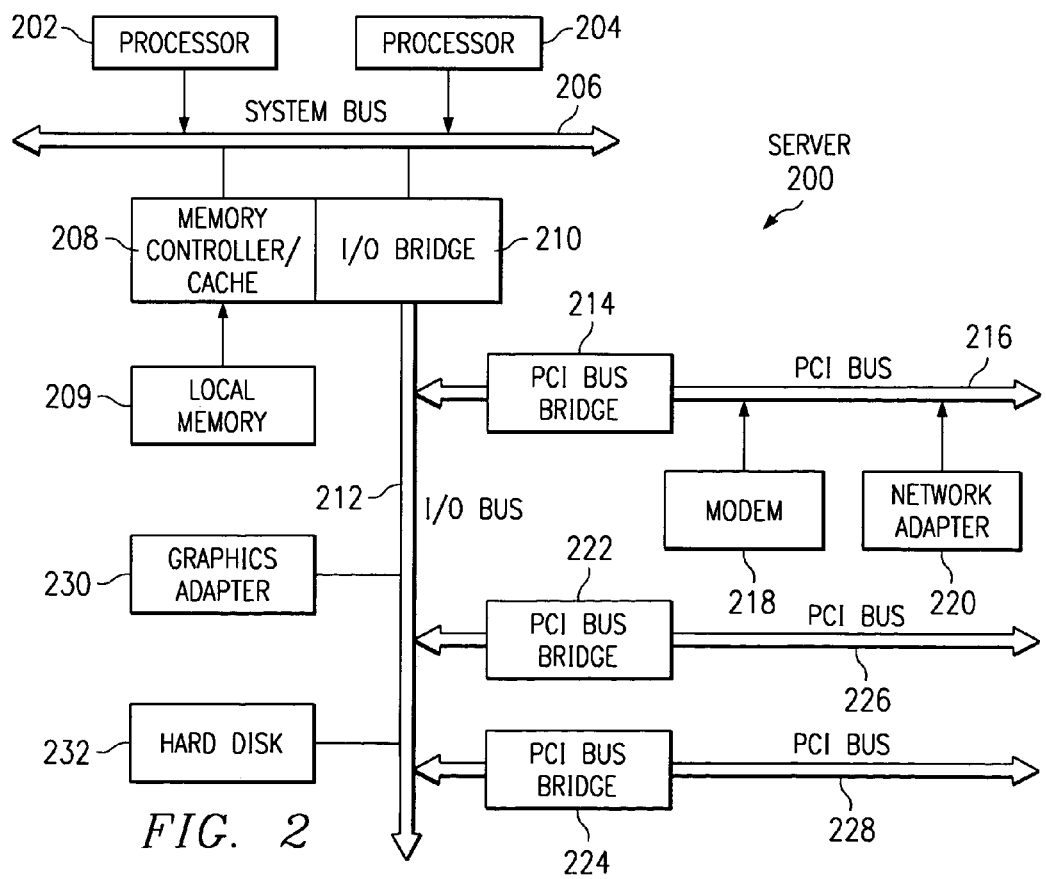
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
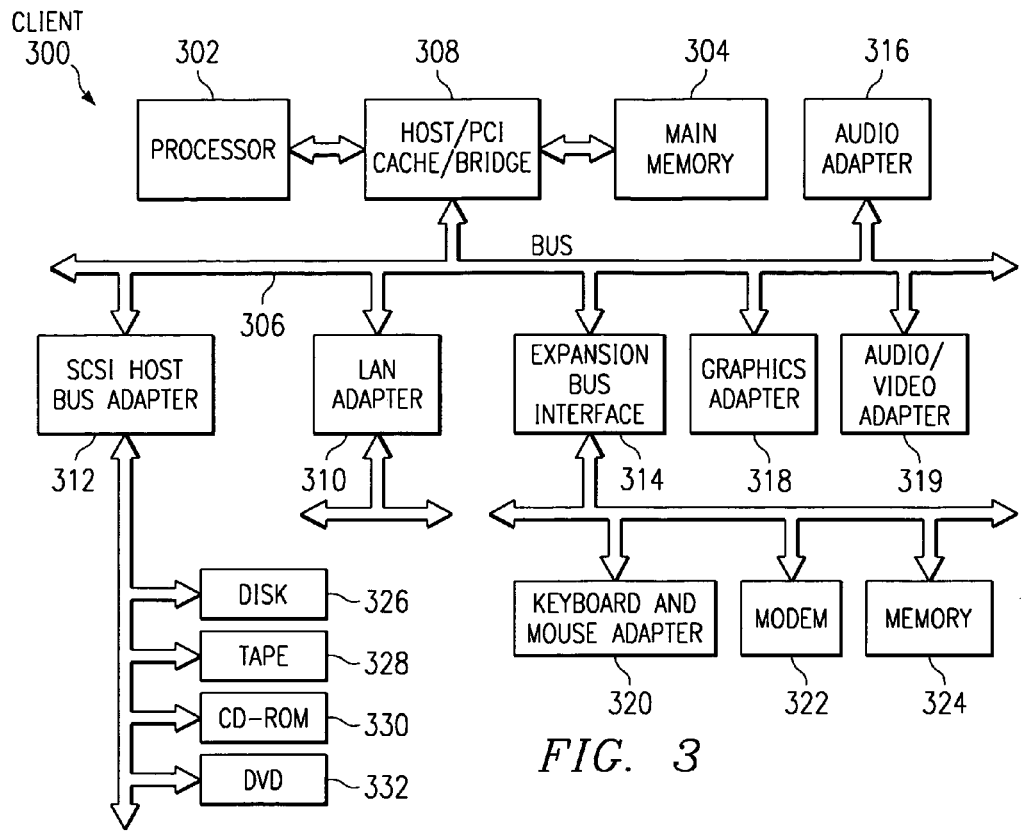
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations.

For example, data processing system 300 also may be a notebook computer or hand held computer in addition to taking the form of a PDA. Data processing system 300 also may be a kiosk or a Web appliance.

Figure 4:
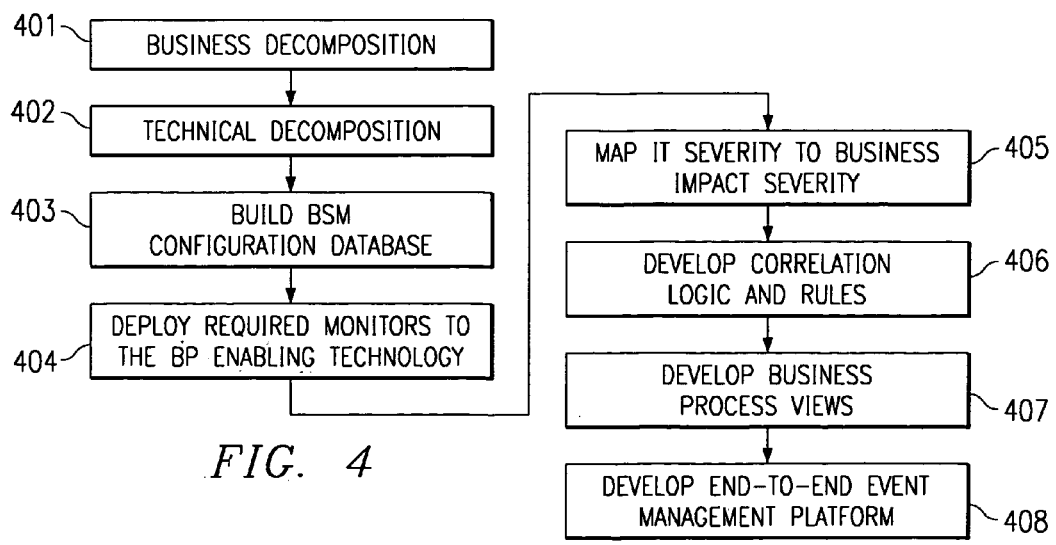
FIG. 4 depicts a flowchart illustrating a method for developing an end-to-end application Event Management platform in accordance with the present invention.

Referring now to FIG. 4, a flowchart illustrating a method for developing an end-to-end Event Management application is depicted in accordance with the present invention. The first step is business decomposition (step 401). In this step, the exact steps necessary to effect a successful business transaction, from the beginning of the process until its successful completion, are documented. Each one of these steps in the business process is associated with an application, and in business decomposition, it is important to harvest from the subject matter experts the names of the applications which enable each of these particular steps. It is through these applications that the business process interacts with various IT technologies. An application functional and operational model is developed which describes the interactions, interdependencies and interfaces of all the business process enabling applications. The functional and operational model is an important component to determining where monitors should be deployed to optimally manage the technology enabling a particular business process. It is important to identify the metric used by the business to gauge the economic health of the business process in order to quantify the costs and benefits of implementing a solution.

After business decomposition, the next step is technical decomposition (step 402). This involves identifying and documenting all of the technology elements and support organizations which are necessary to execute the enabling applications of a particular business process. As the technology is identified, it is important to have the subject matter experts explain the events, monitors, and management systems that are currently in place. With the business process decomposed into its parts and traced to the relevant IT technology components, a Business System Management (BSM) configuration database can be built (step 403).

With the BSM database established, monitors for the business process enabling technology can be designed and deployed (step 404). The monitors allow the design team to precisely document the particular IT functions occurring during a specific business process.

Through proper monitoring, it is then possible to properly map IT severity to business impact severity (step 405). This mapping helps to present a clearer picture of how IT technical problems relate to business processes and is crucial to integrating the IT infrastructure into a single end-to-end application aimed at optimizing business processes (from an IT perspective). For example, it is possible that an IT failure may have no discernible effect on a business process. By the same token, a given IT failure may affect one business process substantially, but not another. Of absolute importance to this step is a metric to allow the quantification of business losses due to particular IT failures.

Currently, IT components are compartmentalized into isolated towers, as explained above. When implementing a business process, these IT towers are only aware of their own particular performance, without any knowledge of how that performance interacts with other IT towers and, ultimately, the business process. For example, the support team for a mainframe computer within the network may be able to show that the mainframe was up and operational 98% of a specified time period. However, this, in and of itself, reveals nothing concerning impact on the business process supported by the mainframe.

As a further example, if each isolated tower is functioning within acceptable parameters and only one is operating near the margin of its performance tolerance, there might be no effect upon the business process. However, if several of the towers are at the margin of their respective tolerances, the aggregate effect could disrupt the business process as a whole, even though each tower is working within its own "acceptable" range. Properly mapping the IT severity to the business impact severity presents a much clearer picture of how disparate IT performance parameters interact and affect the overall business process.

It is now possible to develop correlation logic and rules within a business context (step 406), which will enable the formulation of a business process view that integrates technical and business concerns into a unified conceptual structure (step 407). From here, an integrated end-to-end event management platform can be developed for the business process (step 408). In essence, this event management platform is a "super" application custom fitted to a specific business process and is constructed using several smaller, disparate applications, and their associated IT elements.

It is very likely that the new end-to-end platform will need to integrate with an existing event management process, outside the scope of the contracted services. In order to build an end-to-end event management process that is larger than the event management platform, it will be necessary to integrate the platform at both the process and technology level. Essentially, the event management platform will have a defined input/output event management "socket" that helps effect integration into the overall event management architecture.

The development of an event management platform is not limited to business processes within a single business entity. An event management platform may also be developed between several business entities, particularly those entities with continuing, long-term relationships. For example, a supplier and distributor would certainly benefit from developing a common event management platform, considering their interdependence and the myriad of disruptions which naturally occur in such a relationship.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for integrating information technology components into a single end-to-end application, comprising:

decomposing a business process into a set of enabling applications;

documenting the technology elements and support organizations which are necessary to execute and manage the enabling applications of the business process;

deploying required monitors for the business process enabling technology;

developing cross-platform contextual correlation logic and rules;

mapping information technology severity to business impact severity, said mapping describing how technical problems relate to business processes including said business process;

quantifying, using said mapping, business losses due to particular technical failures using the cross-platform contextual correlation logic and rules; and developing an end-to-end business process event management platform.

2. The method according to claim 1, wherein the step of decomposing the business process further comprises developing an application model which describes the interactions, interdependencies and interfaces of all the business process enabling applications.

3. The method according to claim 1, further comprising building a business system management configuration database.

4. The method according to claim 1, further comprising integrating the business process event management platform into a preexisting event management process.

5. The method according to claim 4, further comprising integrating the platform at both the business and technology level through a defined input/output event management interface.

6. The method according to claim 1, wherein the event management platform is developed across two or more separate business entities.

7. A computer program product in a computer readable storage medium, for use in a data processing system, for integrating information technology components into a single end-to-end application, comprising:

instructions for decomposing a business process into a set of enabling applications;

instructions for documenting the technology elements and support organizations which are necessary to execute and manage the enabling applications of the business process;

instructions for deploying required monitors for the business process enabling technology;

instructions for the development of cross-platform contextual correlation logic and rules;

instructions for mapping information technology severity to business impact severity, said mapping describing how technical problems relate to business processes including said business process;

instructions for quantifying, using said mapping, business losses due to particular technical failures using the cross-platform contextual correlation logic and rules; and instructions for developing an end-to-end business process event management platform.

8. The computer program product according to claim 7, wherein the instructions for decomposing the business process further comprise instructions for developing an application model which describes the interactions, interdependencies and interfaces of all the business process enabling applications.

9. The computer program product according to claim 7, further comprising instructions for building a business system management configuration database.

10. The computer program product according to claim 7, further comprising instructions for integrating the business process event management platform into a preexisting event management process.

11. The computer program product according to claim 10, further comprising instructions for integrating the platform at both the business and technology level through a defined input/output event management interface.

12. The computer program product according to claim 7, wherein the event management platform is developed across two or more separate business entities.

13. A computer system having means for integrating information technology components into a single end-to-end application, comprising:

means for decomposing a business process into a set of enabling applications;

means for documenting the technology elements and support organizations which are necessary to execute the enabling applications of the business process;

means for deploying required monitors for the business process enabling technology;

means for developing cross-platform contextual correlation logic and rules;

means for mapping information technology severity to business impact severity, said mapping describing how technical problems relate to business processes including said business process;

using said mapping for quantifying business losses due to particular technical failures using the cross-platform contextual correlation logic and rules; and means for developing an end-to-end business process event management platform.

14. The computer system according to claim 13, wherein the means for decomposing the business process further comprise means for developing an application model which describes the interactions, interdependencies and interfaces of all the business process enabling applications.

15. The computer system according to claim 13, further comprising means for building a business system management configuration database.

16. The computer system according to claim 13, further comprising means for integrating the business process event management platform into a preexisting event management process.

17. The computer system according to claim 16, further comprising means for integrating the platform at both the business and technology level through a defined input/output event management interface.

18. The computer system according to claim 13, wherein the event management platform is developed across two or more separate business entities.

* * * * *